United States Patent
Foulquier

[11] Patent Number: 6,145,858
[45] Date of Patent: Nov. 14, 2000

[54] VEHICLE AXLE EQUIPPED WITH TORSIONAL SUSPENSION ELEMENTS

[75] Inventor: Jacques Foulquier, Cebazat, France

[73] Assignee: Compagnie Générale des Etablissements Michelin - Michelin & Cie, Clermont-Ferrand Cedex, France

[21] Appl. No.: 09/310,523

[22] Filed: May 12, 1999

[30] Foreign Application Priority Data

May 13, 1998 [FR] France ................................ 98 06276

[51] Int. Cl.⁷ .................................................. B60G 3/99
[52] U.S. Cl. ................................ 280/124.13; 280/124.77
[58] Field of Search ........................ 280/124.13, 124.66, 280/142.77

[56] References Cited

U.S. PATENT DOCUMENTS

| | | |
|---|---|---|
| 2,270,572 | 1/1942 | Woolson et al. . |
| 2,438,432 | 3/1948 | Edwards .............................. 280/124.13 |
| 3,467,421 | 9/1969 | Bentley . |
| 3,601,426 | 8/1971 | Hury . |
| 3,615,081 | 10/1971 | Ravenel .............................. 280/124.13 |
| 3,778,082 | 12/1973 | Grosseau ............................. 280/124.13 |
| 4,166,640 | 9/1979 | Van Denberg . |
| 4,491,342 | 1/1985 | Aubry ................................ 280/124.13 |
| 4,991,868 | 2/1991 | Van Denberg . |
| 5,378,010 | 1/1995 | Marino et al. ....................... 280/124.13 |

FOREIGN PATENT DOCUMENTS

| | | |
|---|---|---|
| 0600198 | 6/1994 | European Pat. Off. . |
| 0649764 | 4/1995 | European Pat. Off. . |
| 2373409 | 7/1978 | France . |
| 2691109 | 11/1993 | France . |
| 2720801 | 12/1995 | France . |
| 7331009 | 1/1979 | Germany . |
| 2804256 | 8/1979 | Germany . |
| 554695 | 7/1943 | United Kingdom . |
| 9747486 | 12/1997 | WIPO . |

*Primary Examiner*—Kenneth R. Rice
*Attorney, Agent, or Firm*—Baker Botts L.L.P.

[57] ABSTRACT

An axle for vehicles having a suspended body, the axle having a crossmember connecting two arms. The arms are each joined to a shaft defining a pivot axis of the arms on the body. The crossmember allows for a relative clearance of said suspension arms. The axle further contains two supports. A resilient suspension joint is inserted between each support and each shaft, each resilient joint being integral, without sliding, both with the support and the shaft. Each resilient joint contains holes defining a position of less radial rigidity arranged approximately vertically.

15 Claims, 2 Drawing Sheets

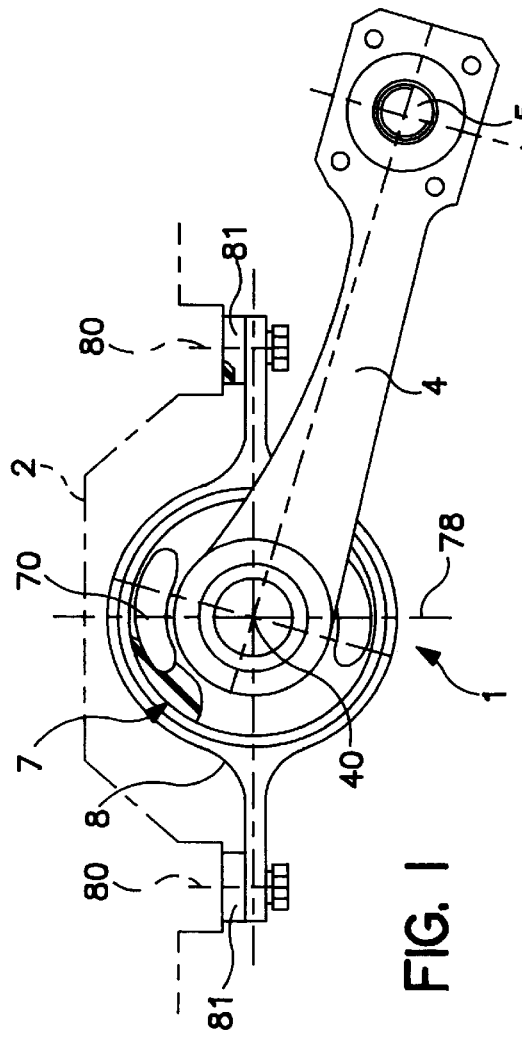
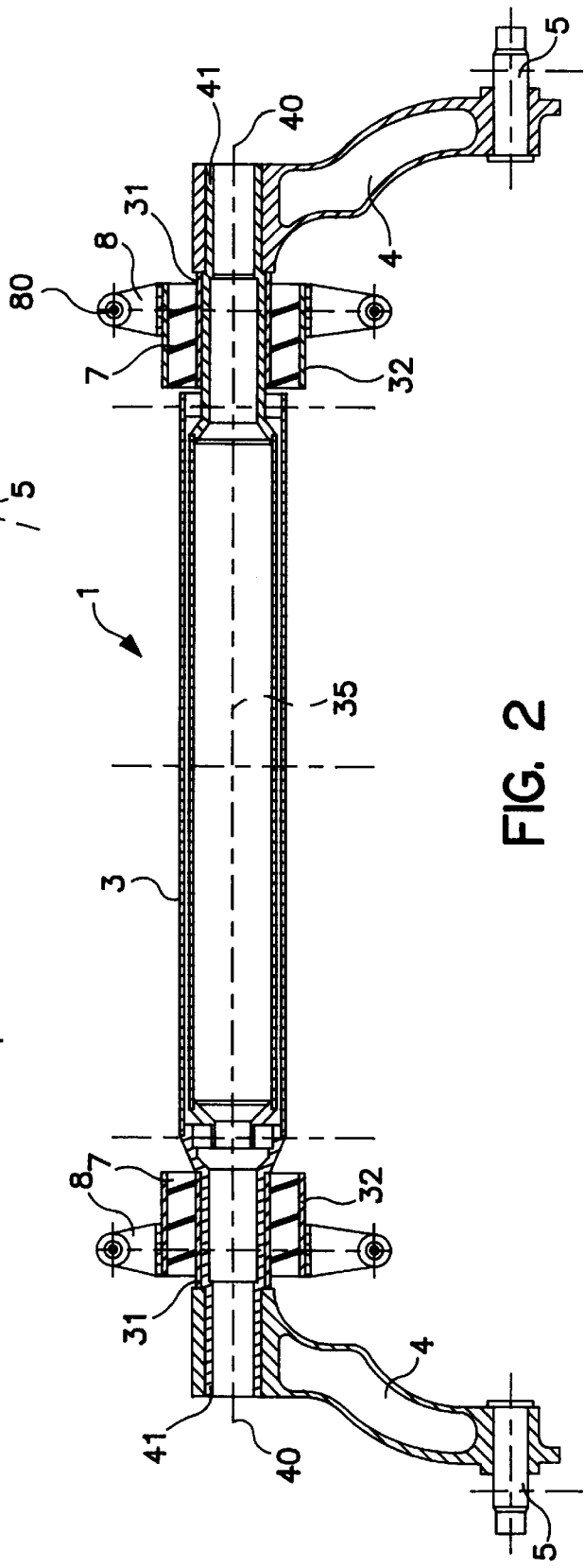
FIG. 1
FIG. 2

VEHICLE AXLE EQUIPPED WITH TORSIONAL SUSPENSION ELEMENTS

BACKGROUND OF INVENTION

The invention relates to motor vehicle suspensions, and in particular, to the category of axles having two suspension arms, one end of which bears a stub axle for receiving a wheel and the other end being coupled on the body of the vehicle by means of a shaft, and further having a crossmember joining the two suspension arms, and whose main element, providing a "suspension spring" function, is a torsion-stressed resilient joint. Patent application WO 97/47486 describes an axle of this kind.

One of the advantages of using elastomeric flexible joints serving as suspension springs in pivot bearings of the axle on the body of the vehicle is to facilitate greater integration of vibration or shock spring absorption or filtering functions. Depending on the specifications to be satisfied for the different vehicles, this type of axle can make it possible to reduce the total number of parts used, notably, because separate filtering blocks are used, such are commonly used for coupling the axles or suspension arms to the body. Such elastomeric blocks have become universal and have supplanted the use of ball-bearings, for they are capable of providing the degree of freedom required, while ensuring good filtering favorable to comfort, notably on the acoustic level. Furthermore, such filtering blocks can be provided with rather elaborate guiding functions controlling their deformation under working stresses in order to make, for example, autodirectional axles, that is, axles which slightly steer the wheels under the sole effect of load transfers.

In the case of elastomeric joints, such as those used to couple suspension arms to the body, their contribution to takeup of the load is negligible (in the order of one percent). In fact, their contribution to takeup of the load, which is low and inherent, absolutely does not influence the sizing of the joint. If it is sought to make a real contribution to takeup of the load with such joints, adding to such joints the function of a suspension spring, one finds that it becomes difficult to preserve their customary filtering properties. Thus, a true concentration in the same element of suspension spring and filtering functions appears problematical.

SUMMARY OF THE INVENTION

The invention proposes a configuration and an arrangement of suspension joints which makes it possible to combine good filtering properties with the capacity to carry the load of the vehicle, while providing good suspension resilience. The filtering performances of the resilient joints so designed and installed are such that, in some cases, it proves possible not to have to add other rubber blocks for filtering purposes.

The invention thus provides an axle which is easy to make, while, due to integration of the functions it performs, facilitates mounting of the axle on the vehicle.

The invention proposes an axle for suspending the body of a vehicle, said axle having two suspension arms and a crossmember, each of said arms being coupled at one end to a shaft defining a pivot axis of said arm relative to the body and bearing at the other end a stub axle intended to receive a wheel, said crossmember coupling the arms and allowing a relative clearance of said suspension arms, said axle further having two supports with reference surfaces for mounting the axle on said body, a resilient suspension joint between each support and the corresponding shaft, said resilient joint having an elastomeric sleeve which is integral, without sliding, with both the support and said corresponding shaft, said resilient joint containing at least one hole positioned in the resilient joint so as to define a reference axis perpendicular to the pivot axis, the radial rigidity of said joint being minimal along said reference axis, and said pivot axis of said arm relative to the body being oriented generally parallel to the axis of rotation of the wheel defined by the stub axle.

In an advantageous variant, said reference axis is oriented generally perpendicular to the horizontal plane of reference joined to the body of the vehicle. The expression "horizontal plane of reference joined to the body" is understood here to mean the plane which moves parallel to the road during rolling of the vehicle under normal conditions. As for the suspension joint, being intended to operate in torsion on a pivot axis, "radial rigidity" is understood to mean the rigidity of the joint in any direction perpendicular to said pivot axis, that is, in any radial direction. In the present invention, the resilient joint not being isotropic, the rigidity value depends on the orientation of the resilient joint. The radial direction along which the radial rigidity is minimal is called "reference axis." The resilient joints forming suspension springs integrated with the axle, the latter contains a "reference surface for mounting on said body," that is, one or more bearings which, on mounting, come in contact with said body, and whereby the axle is fastened to the body, the transmission of stresses between body and axle passing through said bearing or bearings. This reference surface makes it possible, in the isolated axle, to find the horizontal plane of reference mentioned above.

DESCRIPTION OF THE DRAWINGS

The invention will be better understood by the description to follow, given nonlimitatively, and is illustrated by the attached drawings in which:

FIG. 1 is a side view of an axle according to the invention;

FIG. 2 is a plan view of the same axle;

DESCRIPTION OF PREFERRED EMBODIMENTS

Figure 4:
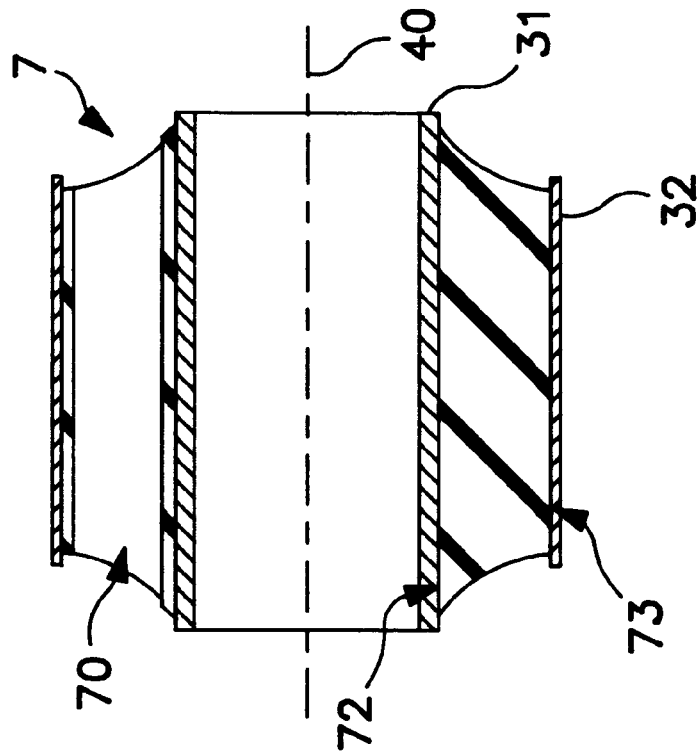
FIG. 4 is a section along the cutting planes marked by CC in FIG. 3.

Referring to FIGS. 1 and 2 together, one can see an axle 1, intended to be mounted on the body 2 of a vehicle by means of supports 8 forming four points 80 of fastening to the body, possibly by means of rubber blocks 81. The supports which are two independent parts here, could be part of a single cradle mounted on the body. The axle 1 includes a crossmember 3 joining two suspension arms 4. The suspension arms are directly mounted on the crossmember 3 at their pivot axis 40 (that is, their axis of clearance from the body 2 of the vehicle). In the particular case described here, the pivot axis 40 of the arms 4 relative to the body and the axis 35 of the crossmember 3 are merged.

The suspension arms 4 bear a stub axle 5 on the side opposite the pivot axis 40. Each stub axle 5 is intended to receive a wheel. It can be seen in FIG. 2 that the crossmember joining the two arms forms a U-shape with the latter. The crossmember 3 itself is formed as described in the aforesaid application WO 97/47486; reference can be made to this document for more information on the crossmember itself.

The axle illustrated in the different figures integrates the suspension function. Resilient suspension joints 7 surround each of the shafts 41 on which they are mounted without possible relative rotation. The same resilient joints 7 are also mounted on the support 8, also without possible relative rotation. The resilient joints 7 form torsion springs through which the weight of the vehicle can be transmitted. The resilient joints are made of rubber.

Figure 3:
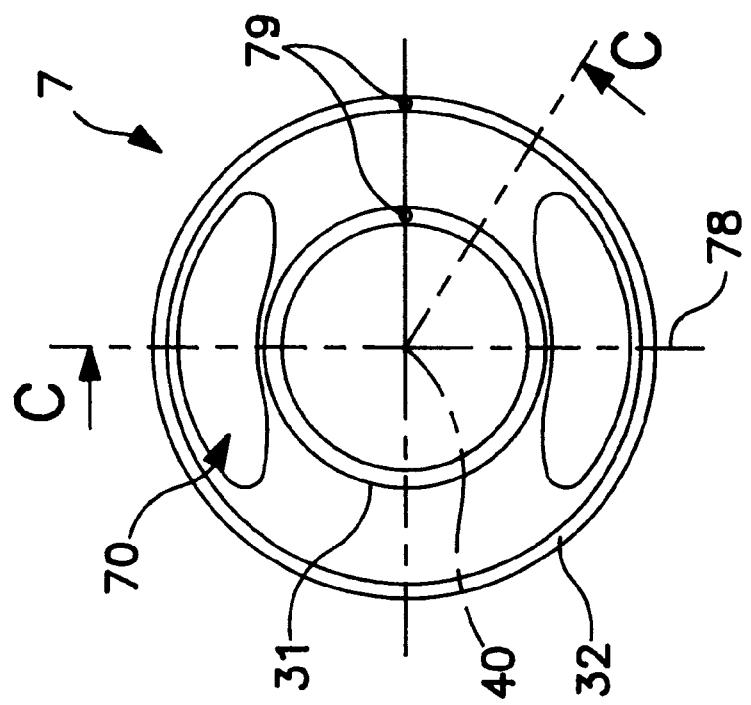
FIG. 3 is a view of a resilient joint used in the axle according to the invention.

In FIG. 3, one of the resilient joints 7 is represented, the joints being identical at both ends of the axle 1. A resilient joint 7 is a bearing formed essentially by an elastomeric sleeve 71 arranged between an inner frame 31 and an outer frame 32, integrated without possible sliding on those frames, for example, by the known method of adhesion. The outer frame provides a reference surface for mounting the axle on said body. The sleeve 71 contains two diametrically opposite holes 70. At least one of the holes (two here) opens out on one of the lateral faces of the sleeve 71. Here, the holes traverse the sleeve, that is, they open out on the both lateral faces of the sleeve 71. In FIGS. 1 and 3, the holes 70 have the appearance they take when the resilient joints take up the nominal load for which it is designed. The position of the hole or holes 70 defines a reference axis 78 along which the radial rigidity is minimal. This means that, for a given level of a stress which tends to displace the inner frame 31 by translating the axis 40 parallel to itself, while the outer frame 32 is immobile, the displacement will be greater if the stress is oriented parallel to the reference axis 78.

Of course, the resilient joints 7 are so azimuthed that the reference axis 78 is oriented generally vertically, that is, generally perpendicular to the horizontal plane joined to the body 2 of the vehicle. Unexpectedly, in that position the acoustic filtering performances prove the best. As for the sensitivity of positioning of the reference axis, it seems that the orientation of said reference axis should preferably range between limits of +45° and −45° relative to a line perpendicular to said horizontal plane.

Furthermore, it can be seen that the width of the radially inner face 72 of each sleeve 71 is greater than the width of the radially outer face 73 of said sleeve.

The invention is applicable in particular as a rear wheel axle assembly of a small and medium-sized passenger vehicle. The invention makes it possible to eliminate the helical springs or torsion bars ordinarily used as suspension springs. Different variants and adaptations can, of course, be devised, for example, adding an element also contributing to takeup of the load of the vehicle and acting in parallel with the resilient joint 7, such as for example, a pneumatic spring responsible for ensuring the compensations necessary to guarantee constant road clearance regardless of the load. However, the resilient joints 7 here are truly elements contributing substantially to takeup of the total load supported by the wheel considered, in contrast to the rubber blocks commonly used, which have only a filtering and guiding function and whose contribution to takeup of the load is negligible (in the order of a few percent) and does not influence the size. Although it is difficult to quantify absolutely that minimal contribution to takeup of the load due to the resilient joints, to put things in perspective, it can be considered that it will in any case be much greater than 10%.

Because of the spring suspension function ensured by the joints 7 described, when they are mounted in the axle, they provide a preload (they are prestressed) like the metal suspension springs (torsion bars or helical springs) of a vehicle. In general, a preload still exists even when the vehicle is on an elevator platform or jack with the wheels hanging. This distinguishes such standard joint elements, whose negligible participation in takeup of the load absolutely does not influence the sizing. Ordinary joints, that is, those not playing the role of a spring, are mounted without preload. Hence, from another aspect, the invention extends also to an element forming a resilient suspension joint and torsion spring, containing an elastomeric sleeve 71 arranged between an inner frame 31 and an outer frame 32, integrated without possible sliding on those frames, said outer and inner frames having reference surfaces for mounting on a part rigidly coupled to said body and on a part rigidly coupled to a suspension arm, characterized in that the sleeve 71 contains at least one hole 70 and means for marking the prestressing to be applied to the sleeve 71 in the nominal load position. One can use marks 79 as shown on FIG. 3, that must be radially aligned when the joint 7 takes up the nominal load. Of course, the characteristics relating to the holes described above in relation to resilient joints 7 also apply to such a sleeve 71 having means for mounting a prestressing.

I claim:

1. An axle for a vehicle having a suspended body, said axle comprising two suspension arms, a crossmember, each of said arms being coupled to a shaft defining a pivot axis of said arm relative to the body, each of said arms bearing a stub axle intended for receiving a wheel, said crossmember connecting said arms and allowing a relative clearance of said suspension arms, two supports having reference surfaces for mounting the axle on said body, and a resilient suspension joint between each support and the corresponding shaft, said resilient joint having an elastomeric sleeve which is integral, without sliding, with both the support and said corresponding shaft, the relative movements between said shaft and said support being absorbed by internal deformation at said sleeve, said sleeve containing at least one hole in the resilient joint so as to define a reference axis perpendicular to the pivot axis, the radial rigidity of said joint being minimal along said reference axis, and said pivot axis of said arm relative to the body being oriented generally parallel to the axis of rotation of the wheel defined by the stub axle.

2. An axle according to claim 1, in which said reference axis is oriented generally perpendicular to the horizontal plane of reference joined to the body of the vehicle.

3. An axle according to claim 2, in which the orientation of said reference axis ranges between the limits of +45° and −45° relative to the line perpendicular to said horizontal plane.

4. An axle according to claim 1, in which at least one hole opens out on one of the lateral faces of the sleeve.

5. An axle according to claim 4, in which the at least one hole traverses the sleeve.

6. An axle according to claim 1, including two holes opposite each other relative to the pivot axis.

7. An axle according to claim 1, in which said sleeves are made of rubber.

8. An axle according to claim 1, in which the width of the radially inner face of each sleeve is greater than the width of the radially outer face of said sleeve.

9. An axle according to claim 1, in which the contribution of said resilient joint to takeup of the load supported by said wheel is greater than 10% of the total load supported by the associated wheel.

10. An element forming a resilient suspension joint and torsion spring, comprising an inner frame, an outer frame, an elastomeric sleeve arranged between the inner frame and the outer frame, integrated without possible sliding on those frames, said outer and inner frames having reference surfaces for mounting on a part rigidly coupled to a suspended body and on a part rigidly coupled to a suspension arm for a wheel, characterized in that the sleeve contains at least one hole and means for marking the prestressing to be applied to the sleeve in the nominal load position.

11. An element according to claim 10, in which at least one hole opens out on one of the lateral faces of the sleeve.

12. An element according to claim 10, in which at least one hole traverses the sleeve.

13. An element according to claim 10, including two holes opposite each other in relation to the pivot axis.

14. An element according to claim 10, in which said sleeves are made of rubber.

15. An element according to claim 10, in which the width of the radially inner face of each sleeve is greater than the width of the radially outer face of said sleeve.

\* \* \* \* \*